A. SUNDH.
SELF ADJUSTING PIVOTAL BEARING.
APPLICATION FILED MAY 7, 1908.

1,132,745.

Patented Mar. 23, 1915.
2 SHEETS—SHEET 1.

Witnesses:
Ernest L. Gale, Jr.
James G. Bethell

Inventor
August Sundh
By Attorney
C. M. Mason

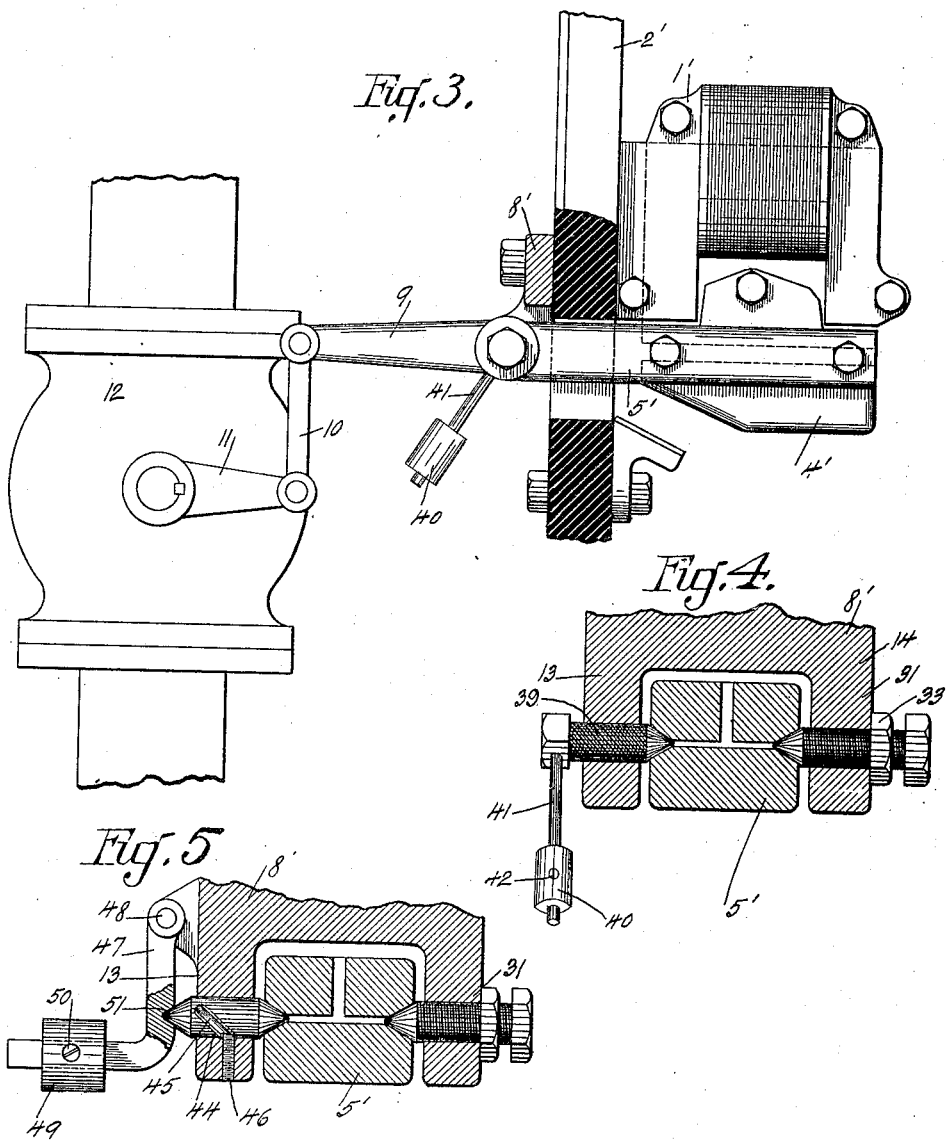

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

SELF-ADJUSTING PIVOTAL BEARING.

1,132,745.

Specification of Letters Patent. Patented Mar. 23, 1915.

Application filed May 7, 1908. Serial No. 431,494.

*To all whom it may concern:*

Be it known that I, AUGUST SUNDH, a citizen of the United States, residing at Yonkers, in the county of Westchester and State of New York, have invented a new and useful Improvement in Self-Adjusting Pivotal Bearings, of which the following is a specification.

My invention relates to self-adjustable pivotal bearings which are specially adapted for use in connection with pivoted armatures of alternating current electromagnets.

The rapid vibration set up in an armature of an electromagnet excited by an alternating current has a constant tendency to loosen the pivotal bearings for the armature, and also greatly increases the wear on such bearings. It is very desirable that a close adjustment of the bearings be constantly maintained, in order to retain the armature in proper alinement and to prevent the excessive vibration and noise caused by loose bearings.

One of the objects of the present invention is to provide means to automatically maintain a close adjustment of such bearings.

Other objects will appear hereinafter, the novel combinations of elements being set forth in the appended claims.

Figure 1:
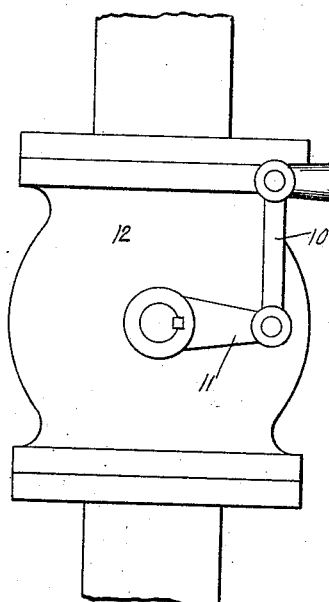
Figure 1:
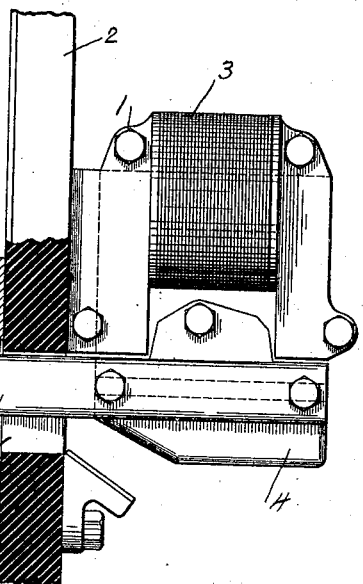
Figure 2:
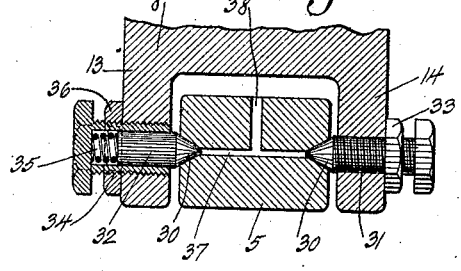

Referring to the drawings in which are illustrated several constructions embodying different forms of my invention, Figure 1 is an elevation, partly in section, of an electromagnet and mechanism operated thereby; Fig. 2 is a sectional elevation of the pivotal bearing for the armature; Figs. 3 and 4 are similar views of a modification; and Fig. 5 is a view similar to Fig. 4 of still another modification.

Referring to Figs. 1 and 2, the electromagnet comprises a frame 1 secured to a switch-board, base-board, or other support 2, a magnet coil 3, and an armature 4. The body of the magnet and the armature are both laminated to adapt the magnet to alternating currents. The armature is secured to the end of a lever 5 which extends through an opening 6 in the base-board 2, and is pivoted intermediate its ends on pivots 31 and 32 carried by a bracket 8 secured to the base 2. The arm 9 of the lever 5 is connected by a link 10 to an arm 11 on the stem of a valve contained within the valve casing 12. The armature is shown connected to a valve merely to illustrate one of the uses to which the magnet may be put, as it is equally well adapted to operate electric switches and various other mechanisms.

Fig. 2 illustrates one form of bearings for the lever 5. As here shown the lever is provided with conical recesses forming bearing surfaces for the conical ends 30 of the bearing pins 31 and 32. The pin 31 is threaded through the lug 14 and locked in adjusted position by the nut 33. The pin 32 is yieldingly mounted in a hollow bolt 34 which is threaded into the lug 13. A coil spring 35 is placed in the hollow bolt between the pin 32 and the head of the bolt, and operates to yieldingly hold the bearing pins in close contact with the lever, and automatically adjust the bearings to take up any lost motion or play in the bearings that would otherwise occur through wear. The hollow bolt 34 is adjustable in the lug 13 to place more or less tension on the spring 35, and is locked in its adjustable position by the lock nut 36. The bearing surfaces in the lever 5 are connected by a small bore 37 communicating with an oil hole 38 and forming a means for lubricating the bearings.

In Fig. 4 the left-hand bearing pin 39 is yieldingly held against the lever 5' by means of a weight 40 adjustably mounted on a rod 41 which is screw-threaded into the head of the bearing-pin. The rod 41 is inclined so that the weight will tend to rotate the bearing pin in a direction to move it inwardly. It will be observed that the pitch of the screw-threads on the pin 39 is quite high, which results in a comparatively wide adjustment of the bearing pin with a small movement of the weight, and also permits the pin to be rotated by an endwise pressure thereon. If the threads on the pin 39 were the same pitch, for example, as those on the pin 31, the weight 40 would have a tendency to gradually tighten the pin 39, causing undue friction which would not be relieved as in the present instance by the pressure on the lever reacting to rotate the bearing pin backward. The weight 40 may be adjusted to any desired position on the rod 41 and locked in such position by the set screw 42. The pressure of the bearing pins against the lever may be varied by varying the diameter of the pin 39, by varying the pitch of the threads thereon or by varying the size of the weight 40, or its position on the rod 41, or the angular position of the rod 41. A convenient means of adjusting the angular position of the rod 41 consists simply in adjusting the pin 31, which will result in a corresponding endwise and consequent angular movement of the pin 39.

In the modification shown in Fig. 5 a bearing pin 44 having a smooth cylindrical body portion is substituted for the pin 39 of Fig. 4. The lug 13 has a smooth cylindrical bore in which the pin 44 is movable endwise. An inclined or helical groove 45 is provided in the cylindrical surface of the pin 44, and a guide pin 46 is threaded into the lug 13 with its inner end extending into the groove 45. A lever 47 is pivoted at 48 to the bracket 8' and is recessed at 51 to receive the outer conical end of the pin 44. A weight 49 is adjustably mounted on the lever and held in position by a set screw 50. The weight 49 acting through the lever 47 exerts an inward pressure on the bearing pin 44. The groove 45 and pin 46 effect a rotary movement of the bearing pin in combination with any longitudinal movement thereof. When the armature is being moved toward its magnet, the friction of the lever 5' on the bearing pin 40 tends to rotate said pin in a direction to move it inwardly and thus tighten the bearings. It will be observed that the same effect is obtained with the construction shown in Fig. 4 in which the pin 39 has a spiral movement.

Although the present invention in the several forms herein disclosed is shown as used in connection with alternating current magnets, it may obviously have a much more general application. The invention may also be embodied in other forms than those herein shown. Various changes also in details of construction and arrangement of parts might be made by those skilled in the art without departing from the spirit and scope of the invention. I wish therefore not to be limited to the precise constructions or their specific uses as herein disclosed.

What I claim as new and desire to secure by Letters Patent of the United States is:—

1. The combination with a support, of a bearing pin mounted therein, a spiral guide for the pin, a pivoted member, and means for effecting a bodily movement of said pin into contact with said member with a yielding pressure.

2. The combination with a pivoted member, of a support, a bearing pin mounted in the support and movable toward and from the pivoted member by a combined longitudinal and rotary movement, and means comprising a pivoted weight for automatically moving the pin toward the pivoted member and holding it yieldingly in contact with said member to form a bearing therefor.

3. The combination with a pivoted member, of a support, a bearing pin mounted in the support and formed with a spiral guiding surface, the pitch of said surface being sufficient to permit the pin to respond to a pressure in the direction of its axis, and means comprising a weight for yieldingly holding the pin in contact with said pivoted member.

4. The combination with a pivoted member, of a bearing pin, a support having a smooth bore in which the pin is mounted, and means comprising a weight separate from said member for yieldingly pressing the pin into contact with said pivoted member.

5. The combination with a pivoted member, of a cylindrical bearing pin having an inclined or spiral groove in its surface, a support having a smooth bore in which the pin is mounted, a guide pin extending into said groove, and means comprising a weight for holding the pivoted member and bearing pin in contact with a yielding pressure.

In testimony whereof, I have signed my name to this specification in the presence of two subscribing witnesses.

AUGUST SUNDH.

Witnesses:
CHAS. M. NISSEN,
JAMES D. IVERS.